T. V. BUCKWALTER.
GUARD FOR BEARINGS.
APPLICATION FILED DEC. 26, 1917. RENEWED JUNE 5, 1920.

1,364,705.

Patented Jan. 4, 1921.

Inventor:
Tracy V. Buckwalter,
Charles N. Butler
By            Attorney.

UNITED STATES PATENT OFFICE.

TRACY V. BUCKWALTER, OF CANTON, OHIO, ASSIGNOR TO TIMKEN ROLLER BEARING COMPANY, OF CANTON, OHIO, A CORPORATION OF OHIO.

GUARD FOR BEARINGS.

1,364,705.     Specification of Letters Patent.     Patented Jan. 4, 1921.

Application filed December 26, 1917, Serial No. 208,734. Renewed June 5, 1920. Serial No. 386,916.

*T all whom it may concern:*

Be it known that I, TRACY V. BUCKWALTER, a citizen of the United States, residing at Canton, in the county of Stark and State of Ohio, have invented Improvements in Guards for Bearings, of which the following is a specification.

My invention relates to improved means for closing a bearing to retain a lubricant and exclude foreign matter. It comprises complementary metal rings, in combination with a felt-ring clamped between them, forming a composite ring adapted to be placed upon an axle within a hub rotatable in contact with the felt.

The characteristic features of my improvements are more fully disclosed in the following description and the accompanying drawings in illustration thereof.

Figure 1:
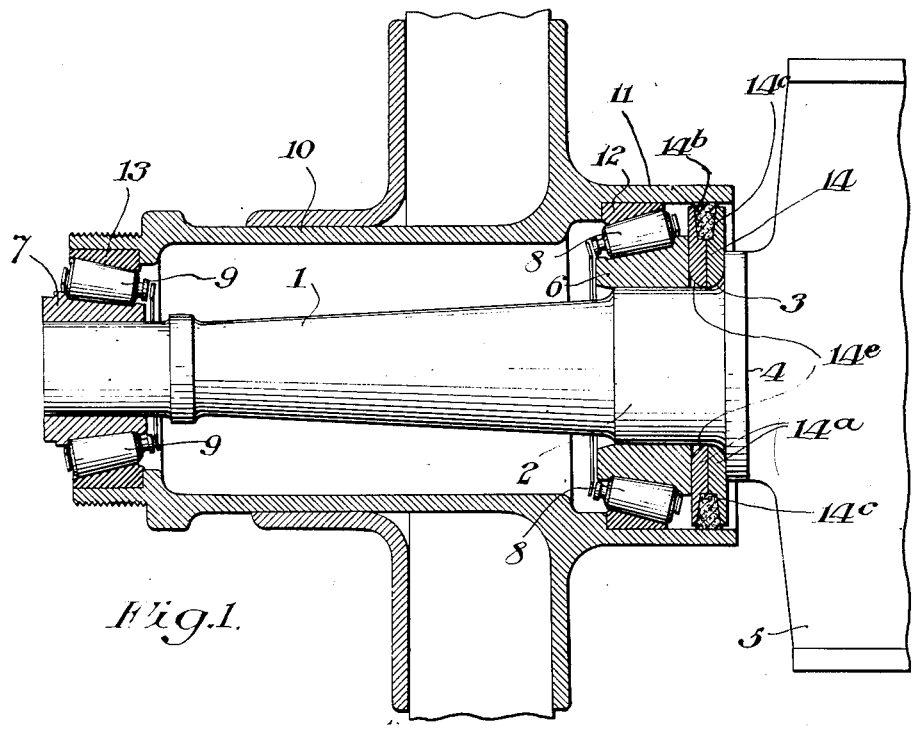
Figure 2:
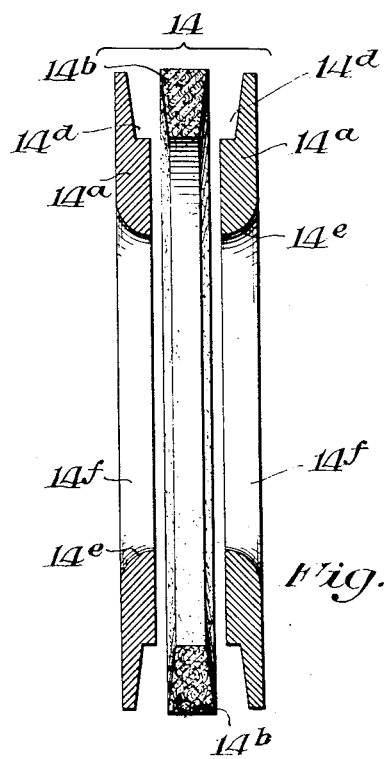

In the drawings, Figure 1 is a sectional view through the axis of a hub mounted on a spindle and having a form of my invention applied thereto; and Fig. 2 is an enlarged sectional view through the axis of the ring of Fig. 1 with its parts separated.

In Fig. 1 of the drawings, there is shown a spindle 1 having an enlarged section 2 connected by the flared or concave surface 3 with the fillet 4 on the knuckle 5, the spindle having fixed thereon the bearings 6 and 7 for the respective sets of rollers 8 and 9. A hub 10 is provided with the circular flange 11, which extends inwardly over the fillet 4, and with the bearings 12 and 13 which engage the respective sets of rollers 8 and 9.

A ring 14 is disposed on the spindle section 2 and clamped between the fillet 4 and the bearing 6, for the purpose, chiefly, of retaining the lubricant and excluding foreign matter, such as grit.

As illustrated in Figs. 1 and 2, the ring 14 comprises the like metal rings or ring sections 14$^a$ combined with the felt ring 14$^b$, which is clamped between them in a peripheral channel 14$^c$, formed by the complementary circular recesses or reëntrant angles 14$^d$. The central aperture of the ring 14 is bound by the surface 14$^e$ rounded or flared in opposite directions from the plane of juncture of the sections 14$^a$, the respective sections 14$^a$ preferably having curved surfaces 14$^f$ (formed on the same comparatively large radius to fit the curve 3) substantially tangent to the faces thereof and together forming a substantial semi-circle cross-section.

This device is composed of parts that are readily formed and readily assembled, without possibility of error or difficulty in assembling as with parts of different construction. Since the metal parts are exactly alike, not only are the advantages attained of being able to manufacture with a single set of dies and to assemble without the necessity for correctly selecting different parts, but further the ring cannot be placed on the spindle in incorrect relation, with resulting improper positioning and action.

Having described my invention, I claim:

1. A ring consisting of two similar parts, said ring having an open peripheral channel, and a ring of pliable material clamped between said parts in said channel.

2. A ring consisting of two similar parts, said ring containing a central aperture flared in opposite directions on each side of a median plane.

In testimony whereof I have hereunto set my name this 20th day of December, 1917.

TRACY V. BUCKWALTER.